United States Patent
Wang et al.

(10) Patent No.: US 12,533,384 B2
(45) Date of Patent: Jan. 27, 2026

(54) ***LACTOBACILLUS REUTERI* CCFM1132 CAPABLE OF RELIEVING HYPERURICEMIA AND APPLICATION THEREOF**

(71) Applicant: Jiangnan University, Wuxi (CN)

(72) Inventors: Gang Wang, Wuxi (CN); Caixin Ni, Wuxi (CN); Yuxing Zheng, Wuxi (CN); Linlin Wang, Wuxi (CN); Jianxin Zhao, Wuxi (CN); Hao Zhang, Wuxi (CN); Wei Chen, Wuxi (CN)

(73) Assignee: Jiangnan University, Wuxi (CN)

( * ) Notice: Subject to any disclaimer, the term of this patent is extended or adjusted under 35 U.S.C. 154(b) by 362 days.

(21) Appl. No.: 18/335,248

(22) Filed: Jun. 15, 2023

(65) Prior Publication Data

US 2023/0381254 A1 Nov. 30, 2023

Related U.S. Application Data

(63) Continuation of application No. PCT/CN2021/138714, filed on Dec. 16, 2021.

(30) Foreign Application Priority Data

Dec. 16, 2020 (CN) .......................... 202011488448.4

(51) Int. Cl.
*A61K 39/02* (2006.01)
*A61K 35/747* (2015.01)
*A61P 19/06* (2006.01)
*C12N 1/20* (2006.01)

(52) U.S. Cl.
CPC ............ *A61K 35/747* (2013.01); *A61P 19/06* (2018.01); *C12N 1/205* (2021.05)

(58) Field of Classification Search
CPC ..... A61K 35/747; A61K 39/02; A23L 29/065; A61P 19/06; C12R 2001/225; A23V 2400/173; A23V 2002/00; A23V 2200/30; A23V 2200/3204; C12N 1/20
See application file for complete search history.

(56) References Cited

U.S. PATENT DOCUMENTS

2020/0214328 A1 7/2020 Hsieh et al.

FOREIGN PATENT DOCUMENTS

| CN | 101160134 A | 4/2008 |
|---|---|---|
| CN | 104684565 A | 6/2015 |
| CN | 108486007 A | 9/2018 |
| CN | 110591945 A | 12/2019 |
| CN | 110607257 A | 12/2019 |
| CN | 110623182 A | 12/2019 |
| CN | 112553117 A | 3/2021 |
| WO | 2006110088 A1 | 10/2006 |

OTHER PUBLICATIONS

Ni, CX et al. "Lactic acid bacteria strains relieve hyperuricaemia by suppressing xanthine oxidase activity via a short-chain fatty acid-dependent mechanism", Food Funct., vol. 12, Jun. 2, 2021, p. 7055-7062.
U W.W. et al, "Potential Role of Probiotics in Ameliorating Psoriasis by Modulating Gut Microbiota in Imiquimod-Induced Psoriasis-Like Mice", Nutrients, vol. 13, Jun. 11, 2021, p. 5-14.
Polak K. et al., "Microbiome Modulation as a Therapeutic Approach in Chronic Skin Diseases", Biomedicines, vol. 9,Oct. 10, 2021 1436.
Li L.Z. et al., "Lactobacillus reuteri attenuated allergic inflammation induced by HDM in the mouse and modulated gut microbes", PLOS ONE, vol. 15 , No. 4, Apr. 21, 2020, 1-13 p. 1-14.
Li L.Z. et al., "Lactobacillus reuteri CCFM1072 and CCFM1040 with the role of Treg cells regulation alleviate airway inflammation through modulating gut microbiota in allergic asthma mice", Journal of Functional Foods, vol. 76, Nov. 24, 2020, 1-13,p. 1-11.
Han, Xiao, "The discrepancy analysis on r-aminobutyric acid production ability among Lactobacillus and its fermented milk used in sleep improvement" Basic science, Chinese doctor's and master's theses full text database, 2019/12 A006-335,Dec. 15, 2019, pp. 1-72.
Zheng, yuxing, "analysis of effects and mechanisms on DSS-induced colitis in mice by different species of lactobacillus", Basic science, Chinese doctor's and master's theses full text database, (Jan. 15, 2021), pp. 1-69.

*Primary Examiner* — Jennifer E Graser
(74) *Attorney, Agent, or Firm* — IPRO, PLLC; Na Xu (57) ABSTRACT

The present disclosure discloses *Lactobacillus reuteri* CCFM1132 capable of relieving hyperuricemia and application thereof, which belongs to the technical field of microorganisms. The *L. reuteri* CCFM1132 can reduce serum uric acid levels of mice with hyperuricemia, inhibit the activity of serum and liver xanthine oxidase (XOD), and reduce the occurrence of hyperuricemia and gout; reduce serum creatinine levels, reduce serum total triglyceride (TG) levels, and inhibit the activity of serum alkaline phosphatase (ALP); and promote the expression of ileum uric acid transporter ABCG2. The *L. reuteri* CCFM1132 of the present disclosure can be used for preparing functional bacterial agents, food and medicines for relieving hyperuricemia and gout, and has a wide application prospect.

8 Claims, 4 Drawing Sheets
Specification includes a Sequence Listing.

SEQUENCE LISTING

```
Sequence total quantity: 4
SEQ ID NO: 1           moltype = DNA  length = 19
FEATURE                Location/Qualifiers
source                 1..19
                       mol_type = other DNA
                       organism = synthetic construct
SEQUENCE: 1
tcctgcacca ccaactgct                                                  19

SEQ ID NO: 2           moltype = DNA  length = 21
FEATURE                Location/Qualifiers
source                 1..21
                       mol_type = other DNA
                       organism = synthetic construct
SEQUENCE: 2
gtcagatcca cgacggacac a                                               21

SEQ ID NO: 3           moltype = DNA  length = 22
FEATURE                Location/Qualifiers
source                 1..22
                       mol_type = other DNA
                       organism = synthetic construct
SEQUENCE: 3
tgccagataa gagggttag gt                                               22

SEQ ID NO: 4           moltype = DNA  length = 20
FEATURE                Location/Qualifiers
source                 1..20
                       mol_type = other DNA
                       organism = synthetic construct
SEQUENCE: 4
tgcttgcagt ggagttgaga                                                 20
```

LACTOBACILLUS REUTERI CCFM1132 CAPABLE OF RELIEVING HYPERURICEMIA AND APPLICATION THEREOF

REFERENCE TO SEQUENCE LISTING

The instant application contains a Sequence Listing in XML format as a file named "YGHY-2023-25-SEQ.xml", created on Jun. 12, 2023, of 5 kB in size, and which is hereby incorporated by reference in its entirety.

TECHNICAL FIELD

The present disclosure relates to *Lactobacillus reuteri* CCFM1132 capable of relieving hyperuricemia and application thereof, which belongs to the technical field of microorganisms.

BACKGROUND

Hyperuricemia (HUA) is a disease in which the uric acid level in the blood exceeds the normal value. In recent years, with the improvement of living standards, the incidence of hyperuricemia is also increasing. Patients with hyperuricemia account for about 13.3% of the total population in China. Uratoma caused by chronic hyperuricemia will further induce gout. Meanwhile, hyperuricemia is considered as a risk factor for cardiovascular and cerebrovascular diseases, chronic kidney diseases and atherosclerosis, which seriously threatens human health. Therefore, the treatment of hyperuricemia has attracted great attention. At present, the medicines for treating hyperuricemia mainly include allopurinol (a xanthine oxidase inhibitor), benzbromarone (a uricosuric medicine), and the like. However, these medicines have some side effects, and there are many controversies about the treatment of uric acid lowering medicine for asymptomatic hyperuricemia on the international. Therefore, diet and lifestyle improvement is a preferred method for treating asymptomatic hyperuricemia. The uric acid lowering function of some *lactobacillus*, such as *Lactobacillus gasseri* PA-3 and *Lactobacillus brevis* DM9218, has been demonstrated by clinical trials and/or animal experiments.

In recent years, with the in-depth research on the relationship between intestinal flora and human health, many studies have confirmed that probiotics can improve human health by regulating intestinal flora. The onset of hyperuricemia is closely related to the structural disorder of the intestinal flora, and the consumption of probiotics can regulate the intestinal microbiota by means of proliferating *lactobacillus* and *bifidobacterium* in intestinal tracts, improve the intestinal barrier function, reduce entrance of endotoxin and other metabolites into the liver along with the blood, and effectively reduce the blood uric acid level. The excretion of uric acid in the human body mainly depends on the excretion of kidney and intestinal tracts, ABCG2 as a uric acid transporter plays an important role in the intestinal excretion of uric acid, and the expression of the intestinal ABCG2 is considered as a new target for treating hyperuricemia and gout. However, at present, no medicine targeting the intestinal ABCG2 has been found.

SUMMARY

A first objective of the present disclosure is to provide *Lactobacillus reuteri* CCFM1132, which has been preserved in the Guangdong Microbial Culture Collection Center on Jul. 22, 2020 with the preservation number of GDMCC No: 61093.

The *L. reuteri* CCFM1132 has the following biological characteristics:
(1) bacterial characteristics: gram stain positive, nonspore and non-motile bacteria;
(2) colony characteristics: circular protrusion, smooth, having a regular edge;
(3) growth characteristics: under the condition of constant temperature of 37° C., culturing in an MRS culture medium for about 12 h to arrive at the telophase of a logarithmic phase; and
(4) high tolerance to simulated gastric and intestinal fluid.

A second objective of the present disclosure is to provide application of the *L. reuteri* CCFM1132 in preparing functional bacterial agents or medicines.

In one embodiment, the medicine has at least one of the following effects:
(1) reducing serum uric acid levels of mammals with hyperuricemia;
(2) reducing the activity of serum and liver xanthine oxidase (XOD) of the mammals with hyperuricemia;
(3) reducing serum creatinine levels of the mammals;
(4) reducing serum total triglyceride levels of the mammals;
(5) reducing the activity of serum alkaline phosphatase of the mammals; and
(6) increasing the mRNA level of ileum uric acid transporter ABCG2 of the mammals.

In one embodiment, the medicine is a medicine capable of relieving hyperuricemia and gout.

In one embodiment, the mammals include, but are not limited to, human.

A third objective of the present disclosure is to provide a composition including the *L. reuteri* CCFM1132.

In one embodiment, the quantity of the *L. reuteri* CCFM1132 is greater than or equal to $1 \times 10^6$ CFU/mL or greater than or equal to $1 \times 10^6$ CFU/g.

In one embodiment, the quantity of the *L. reuteri* CCFM1132 is greater than or equal to $1 \times 10^9$ CFU/mL or greater than or equal to $1 \times 10^9$ CFU/g.

In one embodiment, the composition includes, but is not limited to, microbial preparations or medicines.

In one embodiment, the composition includes a live strain, a dry strain, a strain metabolite or an inactivated strain of the *L. reuteri* CCFM1132.

In one embodiment, the composition is a pharmaceutical composition.

In one embodiment, the pharmaceutical composition is used for inhibiting the activity of xanthine oxidase.

In one embodiment, the pharmaceutical composition is used for inhibiting the elevation of serum creatinine.

In one embodiment, the pharmaceutical composition is used for inhibiting the elevation of the activity of serum total triglyceride and/or serum alkaline phosphatase.

In one embodiment, the pharmaceutical composition is used for promoting the expression of the ileum uric acid transporter ABCG2.

In one embodiment, the medicine further includes a pharmaceutically acceptable carrier.

In one embodiment, the pharmaceutically acceptable carrier includes, but is not limited to, one or more of a filling agent, a wetting agent, a disintegrating agent, a binding agent or a lubricating agent.

In one embodiment, the filling agent is one or more of microcrystalline cellulose, lactose, mannitol, starch or dextrin; the wetting agent is one or more of ethanol or glycerinum; the disintegrating agent is one or more of sodium carboxymethyl starch, crosslinked sodium carboxymethyl starch, crosslinked povidone or low-substituted hydroxypropyl cellulose; the binding agent is one or more of starch paste, syrup, maltose, refined honey or liquid glucose; and the lubricating agent is one or more of magnesium stearate, sodium stearyl fumarate, talcum powder or silicon dioxide.

The present disclosure further claims a method for relieving hyperuricemia, where the method is to administer the *L. reuteri* CCFM1132 or the composition to a subject.

In one embodiment, the method is to ingest the *L. reuteri* CCFM1132 or the composition into an intestinal tract of the subject.

In one embodiment, the relieving hyperuricemia includes any one of the following effects (1) to (6):
(1) reducing serum uric acid levels;
(2) reducing the activity of serum and liver xanthine oxidase;
(3) reducing serum creatinine levels;
(4) reducing serum total triglyceride levels of the mammals;
(5) reducing the activity of serum alkaline phosphatase of the mammals; and
(6) increasing the mRNA level of the ileum uric acid transporter ABCG2 of the mammals.

The present disclosure has the beneficial effects that: the *L. reuteri* CCFM1132 can reduce serum uric acid levels, reduce the activity of serum and liver xanthine oxidase (XOD), and reduce the occurrence of hyperuricemia and gout; the *L. reuteri* CCFM1132 can reduce serum creatinine and serum total triglyceride (TG) levels, and inhibit the activity of serum alkaline phosphatase (ALP); and the *L. reuteri* CCFM1132 can promote the expression of the ileum uric acid transporter ABCG2. The *L. reuteri* CCFM1132 can be used for preparing functional bacterial agents and medicines capable of relieving hyperuricemia and gout, and has a wide application prospect.

Biological Material Preservation

*L. reuteri* CCFM1132 is classified and named as *Lactobacillus reuteri*, and has been preserved in the Guangdong Microbial Culture Collection Center on Jul. 22, 2020 with the preservation number of GDMCC No: 61093.

BRIEF DESCRIPTION OF FIGURES

*$P<0.05$, $P<0.01$, *$P<0.001$, ****$P<0.0001$ (compared with a hyperuricemia model group).

DETAILED DESCRIPTION

Example 1: Screening of *L. reuteri* CCFM1132

(I) Isolation and Screening of *Lactobacillus*
(1) 1 g of fresh feces was taken from a healthy adult. After gradient dilution, the fresh feces was applied to an LBS culture medium to which 1% nystatin was added. The mixture was put in an incubator at constant temperature of 37° C. to be cultured for 48 h.
(2) After the culture, according to the color, size and edge shapes of colonies, the colonies were selected by using an inoculating ring and striated and purified.
(3) The obtained colonies were subjected to gram staining and catalase analysis.
(4) Gram stain positive bacillus and catalase-negative bacillus were retained.

(II) Molecular Biological Identification of *Lactobacillus*
(1) Extraction of monobacterial genome
(A) The *lactobacillus* screened in step (I) was cultured overnight.
(B) 1 mL of bacterial suspension cultured overnight was put in a 1.5 mL centrifuge tube, centrifuged at 10000 r/min for 2 min, and the supernatant was discarded to obtain a thallus.
(C) After the thallus was purged with 1 mL of sterile water, centrifuging was performed at 10000 r/min for 2 min, and the supernatant was discarded to obtain a thallus
(D) 200 μL of SDS lysis solution was added, and a water bath was performed at 80° C. for 30 min.
(E) 200 μL of phenol-chloroform solution was added to the lysis solution of the thallus, where the phenol-chloroform solution includes Tris-saturated phenol, chloroform and isoamylol at a volume ratio of 25:24:1. After reverse uniform mixing, centrifuging was performed at 12000 rpm for 5 to 10 min, and 200 μL of supernatant was taken.
(F) 400 μL of ice ethanol or ice isopropanol was added to 200 μL of supernatant. Standing was performed at −20° C. for 1 h. Centrifuging was performed at 12000 rpm for 5 to 10 min, and the supernatant was discarded.
(G) 500 μL of 70% (volume percentage) ice ethanol was added to resuspend and precipitate. Centrifuging was performed at 12000 rpm for 1 to 3 min, and the supernatant was discarded. Drying was performed by using an oven at 60° C., or air-drying was performed.
(H) 50 μL of ddH$_2$O was redissolved to precipitate for PCR.

(2) 16S rDNA PCR
(A) Bacterial 16S rDNA 50 μL PCR reaction system
10×Taq buffer, 5 μL; dNTP, 5 μL; a primer 27F, 0.5 μL; a primer 1492R, 0.5 μL; a Taq enzyme, 0.5 μL; a template, 0.5 μL; ddH$_2$O, 38 μL.
(B) PCR conditions
95° C., 5 min; 95° C., 10 s; 55° C., 30 s; 72° C., 30 s; steps 2-4, 30×; 72° C., 5 min; 12° C., 2 min.
(C) 1% agarose gel was prepared. Then, PCR products were mixed with 10000× loading buffer. The loading amount was 2 μL. The operation was performed at 120 V for 30 min. Then, gel imaging was performed.
(D) The obtained PCR products were sent to a professional sequencing company. The obtained sequencing results were subjected to searching and similarity comparison in the Genbank by using BLAST, and strains identified as *L. reuteri* were stored at −80° C.

(3) Whole genome sequencing

The extracted whole genome was sent to the professional sequencing company. The whole genome of the bacteria was sequenced by using a second-generation sequencer. The obtained sequence results were subjected to searching and similarity comparison in the Genbank by using BLAST, and a newly discovered strain of the *L. reuteri* identified according to the sequencing results was named as CCFM1132 and stored at −80° C. for later use.

Example 2: *L. reuteri* CCFM1132 has no Toxic or Side Effects on KunMing Mice

*L. reuteri* CCFM1132 was cultured at 37° C. in an MRS culture medium, and a thallus was collected. The thallus was resuspended in a 100 g/L skim milk solution to prepare a bacterial suspension with the concentration of $4.0 \times 10^9$ CFU/mL. 12 healthy male KunMing mice with the weight of about 24 to 32 g were divided into a CCFM1132 group and a control group after a week of acclimatization. 0.3 mL of bacterial suspension with the concentration was given to the CCFM1132 group once a day by intragastric administration. The same volume of 100 g/L skim milk solution without the *L. reuteri* CCFM1132 was given to the control group by intragastric administration. After a week of observation, death and weight were recorded.

These experimental results are listed in Table 1. These results show that when the *L. reuteri* CCFM1132 with the concentration of $1 \times 10^9$ CFU/mouse is fed, there is no obvious effect on the mice, there is no significant change in the weight, and no death occurs. The mice have no obvious pathological symptoms.

TABLE 1

Weight change and death of mice

| | Time (day) | | | | | | |
|---|---|---|---|---|---|---|---|
| | 1 | 2 | 3 | 4 | 5 | 6 | 7 |
| Weight (g) of the CCFM1132 group | 30.33 ± 0.47 | 30.49 ± 0.34 | 31.21 ± 0.38 | 31.54 ± 0.51 | 31.67 ± 0.44 | 32.28 ± 0.47 | 33.12 ± 0.50 |
| Weight (g) of the control group | 29.89 ± 0.53 | 30.37 ± 0.26 | 32.12 ± 0.57 | 33.45 ± 0.66 | 33.69 ± 0.56 | 34.92 ± 0.17 | 35.13 ± 0.22 |
| Death | — | — | — | — | — | — | — |

Example 3: *L. Reuteri* CCFM1132 reduces Serum Uric Acid levels of Mice with Hyperuricemia 24 healthy male KunMing mice with the weight of 24 to 32 g were randomly divided into four groups after a week of acclimatization, namely a control group, a hyperuricemia model group, an *L. reuteri* CCFM1132 intervention group and an allopurinol intervention group (allopurinol). Except the control group, 500 mg/kg BW hypoxanthine was given to the other groups every day by intragastric administration, and 200 mg/kg BW oteracil potassium was intraperitoneally injected to the other groups 1 h later. At 1 h before processing with oteracil potassium, 100 g/L skim milk was given to the control group and the hyperuricemia model group, *L. reuteri* CCFM1132 with the concentration of $1.0 \times 10^9$ CFU/mouse was given to the *L. reuteri* CCFM1132 intervention group, and 5 mg/kg BW allopurinol was given to the allopurinol group. Experimental groups and processing methods are shown in Table 2:

TABLE 2

Groups of experimental animals

| Group | Daily processing methods for 2 to 3 weeks | Daily processing methods for 4 to 5 weeks | Quantity of mice |
|---|---|---|---|
| Control group | Control solvent by intragastric administration | Control solvent by intragastric administration Control solvent by intraperitoneal injection | 6 |

TABLE 2-continued

Groups of experimental animals

| Group | Daily processing methods for 2 to 3 weeks | Daily processing methods for 4 to 5 weeks | Quantity of mice |
|---|---|---|---|
| Hyperuricemia model group | Control solvent by intragastric administration | Control solvent by intragastric administration Hypoxanthine by intragastric administration Oteracil potassium by intraperitoneal injection | 6 |
| Allopurinol group | 5 mg/kg BW allopurinol by intragastric administration | 5 mg/kg BW allopurinol by intragastric administration Hypoxanthine by intragastric administration Oteracil potassium by intraperitoneal injection | 6 |
| L. reuteri CCFM1132 group | L. reuteri CCFM1132 with the concentration of $1 \times 10^9$ CFU/mouse by intragastric administration | L. reuteri CCFM1132 with the concentration of $1 \times 10^9$ CFU/mouse by intragastric administration Hypoxanthine by intragastric administration Oteracil potassium by intraperitoneal injection | 6 |

At the end of the experiment, fresh feces of the mice was collected and frozen at −80° C. After the experiment was finished, the mice were subjected to fasting but free for drinking water for 12 h. 0.1 mL/10 g of 0.1 g/L pentobarbital sodium solution was intraperitoneally injected for anesthetization. Then, blood was sampled from eyeballs, and the mice were killed by cervical dislocation. A blood sample was centrifuged at 3500 r/min for 15 min, and the supernatant was taken and frozen at −80° C. for blood index analysis. After liver, ileum and other tissues were taken out, the tissues were quickly rinsed in pre-cooled normal saline to remove blood. The tissues were quick-frozen in liquid nitrogen and transferred for cryopreservation at −80° C. Subsequently, the tissues were prepared into liver homogenate for determining related indexes. The serum uric acid levels were determined by using a kit method.

Figure 1:
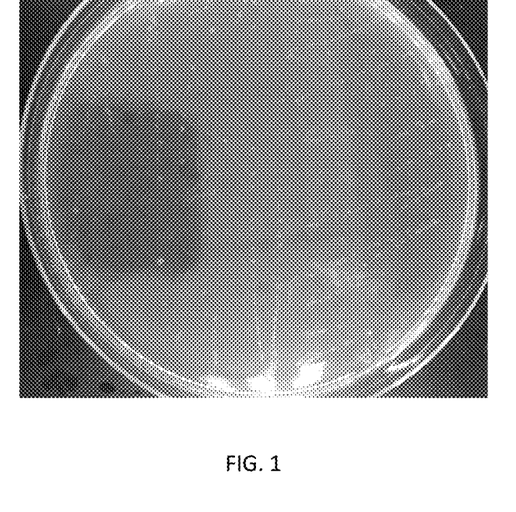
FIG. 1 shows the colony morphology of *L. reuteri* CCFM1132.
Figure 2:
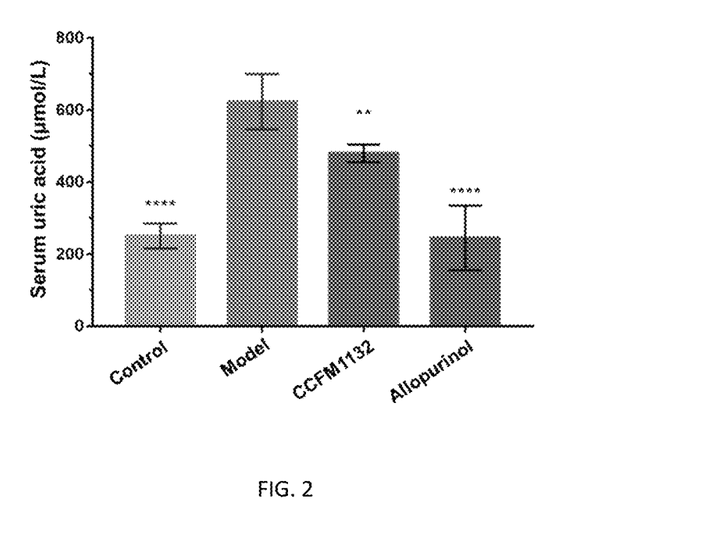
FIG. 2 shows the effect of *L. reuteri* CCFM1132 on serum uric acid (UA) of mice with hyperuricemia.

The effect of the L. reuteri CCFM1132 on the serum uric acid levels of the mice is shown in FIG. 2. Compared with the hyperuricemia model mice, the L. reuteri CCFM1132 can reduce the serum uric acid concentration of the mice with hyperuricemia by 23.03%, which is close to that of the control group; the effect of reducing uric acid is similar to that of the medicine allopurinol; and the occurrence of hyperuricemia and gout can be reduced.

Example 4: L. reuteri CCFM1132 Reduces the Activity of Xanthine Oxidase of Mice with Hyperuricemia Experimental animal groups and processing methods are the same as those of Example 3, and xanthine oxidase (XOD) was detected by using a kit method (Beijing Solarbio).

Figure 3:
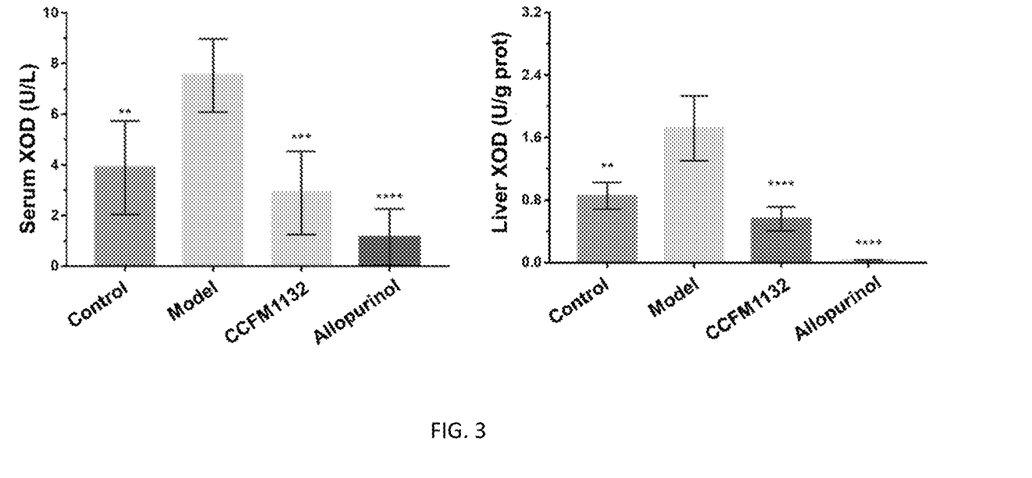
FIG. 3 shows the effect of *L. reuteri* CCFM1132 on the activity of serum and liver xanthine oxidase (XOD) of mice with hyperuricemia.

Xanthine oxidase is a key enzyme in purine metabolism and uric acid synthesis. The uric acid lowering medicine allopurinol can inhibit the activity of xanthine oxidase, so that the synthesis of uric acid is reduced, thereby achieving a uric acid lowering effect. As shown in FIG. 3, compared with the mice with hyperuricemia, the L. reuteri CCFM1132 can reduce the activity of serum and liver xanthine oxidase of the mice with hyperuricemia by 61.64% and 67.44% respectively, so that the increased activity of serum and liver xanthine oxidase of the mice with hyperuricemia tends to be normal, thereby reducing the synthesis of uric acid in the mice, and the prevention and treatment of hyperuricemia and gout are facilitated.

Example 5: L. reuteri CCFM1132 Reduces Serum Creatinine Levels

Experimental animal groups and processing methods are the same as those of Example 3, and serum creatinine was detected by using a Mindray BS480 biochemical analyzer according to a kit method.

Figure 4:
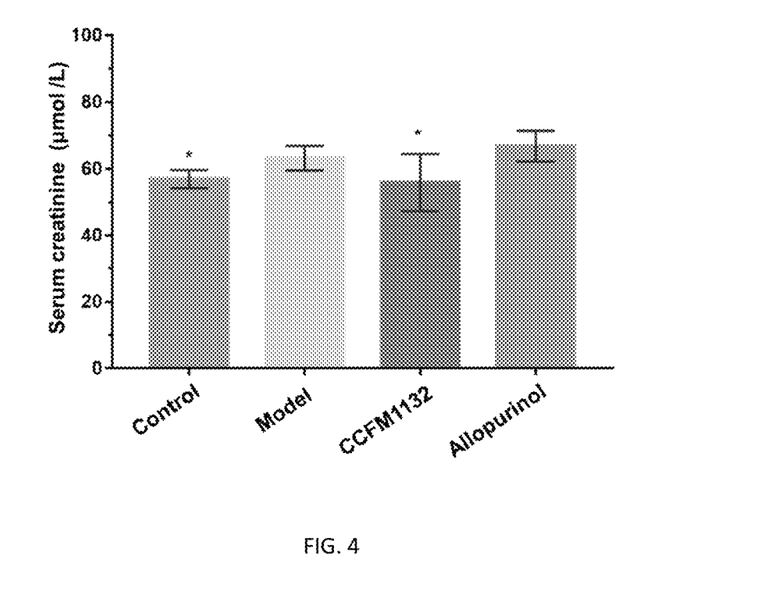
FIG. 4 shows the effect of *L. reuteri* CCFM1132 on serum creatinine (CREA) of mice with hyperuricemia.

The serum creatinine results show that (FIG. 4) the mice with hyperuricemia have a higher serum creatinine concentration up to 63.2±3.7 μmol/L, which indicates that hyperuricemia damages the kidney function of the mice, but the L. reuteri CCFM1132 can reduce the serum creatinine of the mice to 55.9±8.6 μmol/L which tends to be the normal level. However, allopurinol does not have the reducing effect, which indicates that the L. reuteri CCFM1132 can be used for treating and preventing kidney diseases.

Example 6: L. reuteri CCFM1132 Reduces Serum Total Triglyceride Levels

Experimental animal groups and processing methods are the same as those of Example 3, and serum total triglyceride (TG) was detected by using a Mindray BS480 biochemical analyzer according to a kit method.

Figure 5:
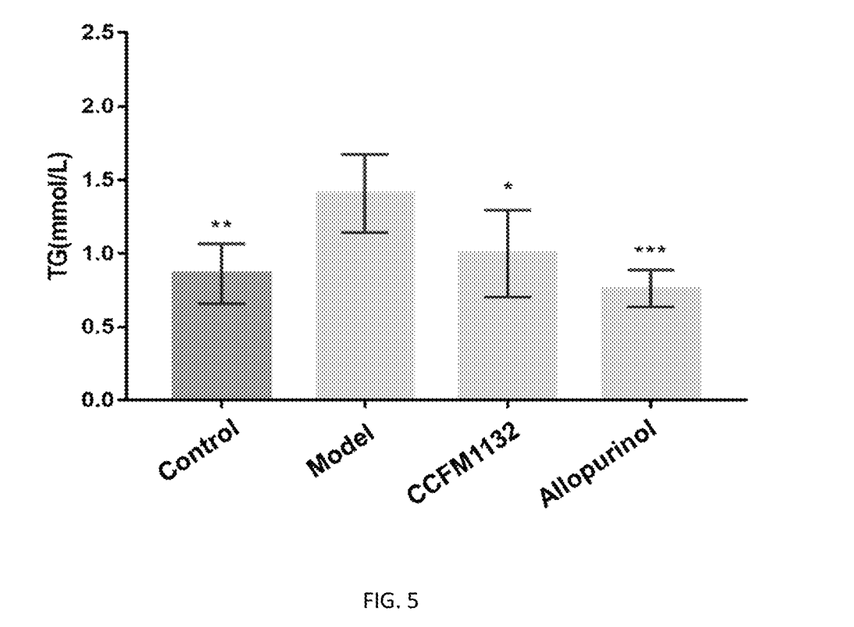
FIG. 5 shows the effect of *L. reuteri* CCFM1132 on total triglyceride (TG) of mice with hyperuricemia.

The effect of the L. reuteri CCFM1132 on the serum total triglyceride of the mice with hyperuricemia is shown in FIG. 5. Compared with the control group, the serum total triglyceride concentration of the mice with hyperuricemia reaches up to 1.41±0.27 mmol/L. The L. reuteri CCFM1132 can recover the serum total triglyceride concentration to 1.00±0.30 mmol/L to reach the normal level. It is indicated that the L. reuteri CCFM1132 has the potential to regulate lipid metabolism and relieve obesity and other diseases.

Example 7: L. reuteri CCFM1132 Reduces the Activity of Serum Alkaline Phosphatase (ALP) of Mice Experimental animal groups and processing methods are the same as those of Example 3, and serum alkaline phosphatase (ALP) was detected by using a Mindray BS480 biochemical analyzer according to a kit method.

Figure 6:
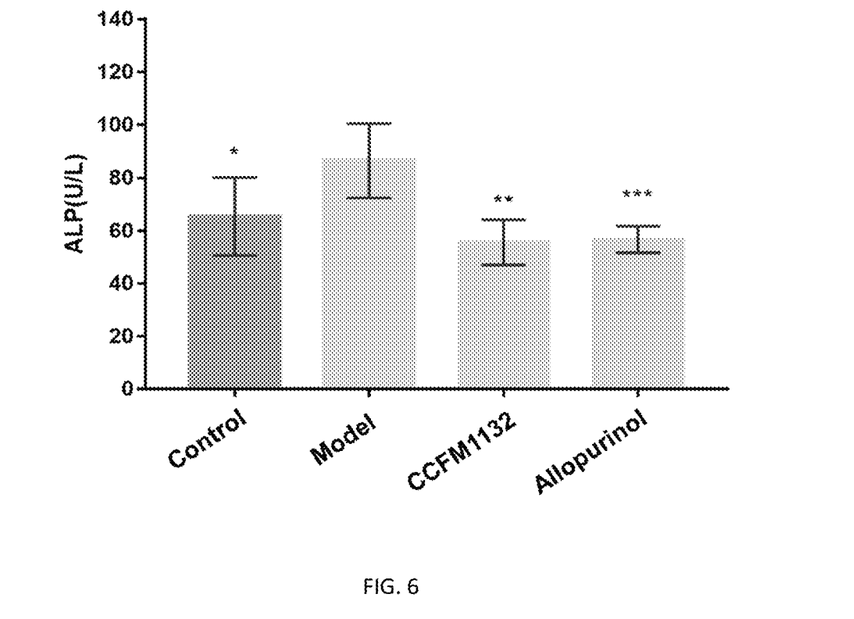
FIG. 6 shows the effect of *L. reuteri* CCFM1132 on serum alkaline phosphatase (ALP) of mice with hyperuricemia.

The results show that (FIG. 6) compared with the control group, the activity of serum alkaline phosphatase of the mice with hyperuricemia is increased to 86.5±14.0 U/L, but the intervention of the *L. reuteri* CCFM1132 can recover the increased activity of serum alkaline phosphatase to 55.6±8.7 U/L to reach the normal level.

Example 8: *L. reuteri* CCFM1132 Increases the mRNA Level of Ileum Uric Acid Transporter ABCG2 of Mice Experimental animal groups and processing methods are the same as those of Example 3.

Determination of ileum ABCG2 mRNA: about 20 mg of ileum tissues were added to 500 μL of Trizol, and after ice bathing and homogenization, RNA in the ileum tissues was extracted by using a conventional method. cDNA synthesis was performed according to the instructions of a reverse transcription kit. Samples were mixed with fluorescent dyes SYBR Green super mix (Qiagen, Germany). The PCR system included 5 μL of mix, 1 μL of cDNA, 1 μL of forward primer and 1 μL of reverse primer. And ddH$_2$O was supplemented to a total volume of 10 μL. Detection was performed on a real-time fluorescence quantitative gene amplification instrument CFX96™ Real-Time System (Bio-Rad, USA). Each sample was provided with 3 parallel holes, and GAPDH was used as an internal reference. The obtained results were analyzed by using a $2^{-\Delta\Delta Cq}$ method. The used primer sequence is shown in Table 3.

TABLE 3 qPCR primer sequence

| Gene | Sequence | |
|------|----------|---|
| GAPDH | F-5'-TCCTGCACCACCAACTGCT | SEQ ID NO. 1 |
| | R-5'-GTCAGATCCACGACGGACACA | SEQ ID NO. 2 |
| ABCG2 | F-5'-TGCCAGATAAGAGGGGTTAGGT | SEQ ID NO. 3 |
| | R-5'-TGCTTGCAGTGGAGTTGAGA | SEQ ID NO. 4 |

Figure 7:
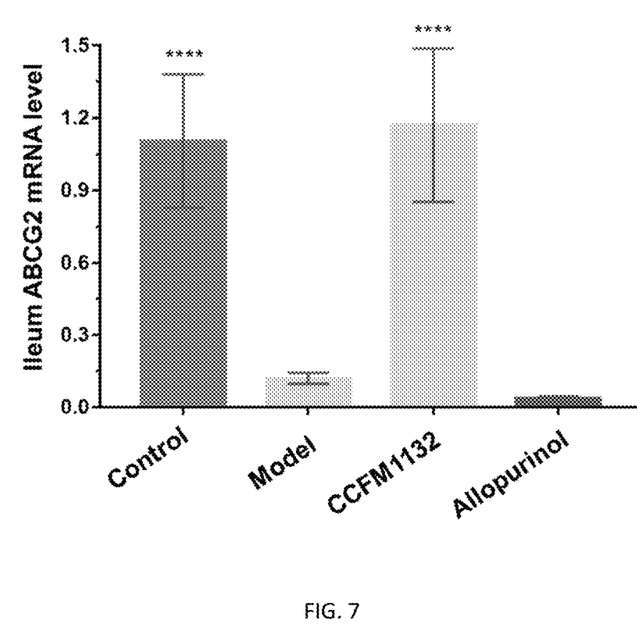
FIG. 7 shows the effect of *L. reuteri* CCFM1132 on the mRNA level of ileum uric acid transporter ABCG2 of mice with hyperuricemia.

The results show that (FIG. 7) the *L. reuteri* CCFM1132 can obviously increase the mRNA level of the ileum ABCG2 of the mice with hyperuricemia. The ileum ABCG2 plays an important role in the excretion of intestinal uric acid, and the *L. reuteri* CCFM1132 can promote the excretion of uric acid by increasing the expression of the ileum ABCG2.

Example 10: Application of *L. reuteri* CCFM1132

The *L. reuteri* CCFM1132 is used for preparing tablets. The specific preparation process of the tablets is as follows:

a single colony of the *L. reuteri* CCFM1132 obtained in Example 1 was inoculated into an MRS liquid medium to be cultured at 37° C. for 24 h to obtain an activation solution; the activation solution was inoculated into the MRS liquid medium according to the inoculation amount of 1% (v/v) to be cultured at 37° C. for 24 h to obtain a primary seed solution; the primary seed solution was inoculated into the MRS liquid medium according to the inoculation amount of 1% (v/v) to be cultured at 37° C. for 24 h to obtain a secondary seed solution; the secondary seed solution was inoculated into the MRS liquid medium according to the inoculation amount of 1% (v/v) to be cultured at 37° C. for 24 h to obtain a bacteria solution; the bacteria solution was centrifuged at 6000×g for 15 min, and precipitates were collected; the precipitates were washed twice with a PBS buffer solution with the pH of 7.4 and then centrifuged again at 6000×g for 10 min to obtain a thallus; the *L. reuteri* thallus was resuspended in a protective agent solution including 130 g/L skim milk, 20 g/L trehalose and 20 g/L sucrose till the cell concentration was 1×10$^{10}$ CFU/mL to obtain a *L. reuteri* solution; the *L. reuteri* solution was freeze-dried to obtain *L. reuteri* powder; and stearic acid serving as a lubricating agent accounting for 2% of the total weight of the *L. reuteri* powder and CMC-Na serving as a binding agent accounting for 3% of the total weight of the *L. reuteri* powder were added to the *L. reuteri* powder and then subjected to tabletting to obtain the tablets.

1 g of the tablet was given to the hyperuricemia model mice every day by intragastric administration (refer to the method of Example 3 for construction) for five weeks, and the serum uric acid levels of the mice were effectively reduced.

Example 11: Application of *L. reuteri* CCFM1132

The *L. reuteri* CCFM1132 can be used for preparing bacterial powder. The specific preparation process of the bacterial powder is as follows:

a single colony of the *L. reuteri* CCFM1132 obtained in Example 1 was inoculated into an MRS liquid medium to be cultured at 37° C. for 24 h to obtain an activation solution; the activation solution was inoculated into the MRS liquid medium according to the inoculation amount of 1% (v/v) to be cultured at 37° C. for 24 h to obtain a primary seed solution; the primary seed solution was inoculated into the MRS liquid medium according to the inoculation amount of 1% (v/v) to be cultured at 37° C. for 24 h to obtain a secondary seed solution; the secondary seed solution was inoculated into the MRS liquid medium according to the inoculation amount of 1% (v/v) to be cultured at 37° C. for 24 h to obtain a bacteria solution; the bacteria solution was centrifuged at 6000×g for 15 min, and precipitates were collected; the precipitates were washed twice with a PBS buffer solution with the pH of 7.4 and then centrifuged again at 6000×g for 10 min to obtain a thallus; the *L. reuteri* thallus was resuspended in a protective agent solution including 130 g/L skim milk, 20 g/L trehalose and 20 g/L sucrose till the cell concentration was 1×10$^{10}$ CFU/mL to obtain a *L. reuteri* solution; and the *L. reuteri* solution was freeze-dried to obtain the powder.

1 g of the powder was given to the hyperuricemia model mice every day by intragastric administration (refer to the method of Example 3 for construction) for five weeks, and the serum uric acid levels of the mice were effectively reduced.

Comparative Example 1

The specific implementation mode is the same as that of Example 3, with the difference lies in that the *L. reuteri* CCFM1132 is replaced with *L. reuteri* 138-1 (published in: *Food and Fermentation Industry*, 2018, 44(08): 57-64), and the serum uric acid indexes of the mice are determined. The results show that the serum uric acid level of the mice in the *L. reuteri* 138-1 group is 582.6±95.8 μmol/L, and compared with the hyperuricemia model group (623.0±76.7 μmol/L), the uric acid level of the mice with hyperuricemia has no obvious change.

Comparative Example 2

The specific implementation mode is the same as that of Example 4, with the difference lies in that the *L. reuteri*

CCFM1132 is replaced with *L. reuteri* 138-1, and the activity of serum and liver xanthine oxidase of the mice is determined. The results show that the activity of serum and liver xanthine oxidase of the mice in the *L. reuteri* 138-1 group is 5.234±0.880 U/L and 1.334±0.395 U/g prot respectively, and compared with the hyperuricemia model group (7.531±1.440 U/L and 1.718±0.416 U/g prot), the *L. reuteri* 138-1 reduces the activity of serum uric acid xanthine oxidase of the mice with hyperuricemia by 30.50%, but promotes the activity of liver xanthine oxidase of the mice with hyperuricemia to increase.

Although the present disclosure has been disclosed with reference to the exemplary examples, they are not intended to limit the present disclosure. Any person skilled in the art can make various changes and modifications without departing from the spirit and scope of the present disclosure, therefore the scope of protection of the present disclosure shall be subject to the scope defined by the claims.

3. The composition according to claim 2, wherein the composition comprises a live strain, a dry strain, or an inactivated strain of the *L. reuteri* CCFM1132.

4. The composition according to claim 3, wherein the composition is a pharmaceutical composition.

5. The composition according to claim 1, wherein:
the filling agent is one or more of microcrystalline cellulose, lactose, mannitol, starch, or dextrin;
the wetting agent is one or more of ethanol or glycerinum;
the disintegrating agent is one or more of sodium carboxymethyl starch, crosslinked sodium carboxymethyl starch, crosslinked povidone or low-substituted hydroxypropyl cellulose; the binding agent is one or more of starch paste, syrup, maltose, refined honey, or liquid glucose; and
the lubricating agent is one or more of magnesium stearate, sodium stearyl fumarate, talcum powder, or silicon dioxide.

---

---

What is claimed is:

1. A composition, wherein the composition comprises a freeze-dried *Lactobacillus reuteri* CCFM1132 powdered formulation, and a pharmaceutically acceptable carrier that comprises one or more of a filling agent, a wetting agent, a disintegrating agent, a binding agent, or a lubricating agent,
wherein the *L. reuteri* CCFM1132 has been preserved deposited in the Guangdong Microbial Culture Collection Center with accession number GDMCC 61093, and
wherein the freeze-dried *L. reuteri* CCFM1132 powdered formulation comprises *L. reuteri* CCFM1132 in a protective agent solution comprising skim milk, trehalose, and sucrose.

2. The composition according to claim 1, wherein the quantity of the *L. reuteri* CCFM1132 is greater than or equal to $1\times10^6$ CFU/mL or greater than or equal to $1\times10^6$ CFU/g.

6. A method for relieving hyperuricemia, which comprises administering orally the composition of claim 1 to a subject in need thereof.

7. The method according to claim 6, wherein relieving hyperuricemia comprises any one of the following effects (a) to (f):

(a) reducing serum uric acid levels;

(b) reducing the activity of serum and liver xanthine oxidase;

(c) reducing serum creatinine levels;

(d) reducing serum total triglyceride levels of mammals;

(e) reducing the activity of serum alkaline phosphatase of mammals; and (f) increasing the mRNA level of ileum uric acid transporter ABCG2 of mammals.

8. The composition according to claim 1, wherein the protective agent solution comprises 130 g/L skim milk, 20 g/L trehalose, and 20 g/L sucrose.

\* \* \* \* \*